Oct. 8, 1929.     C. G. PARKE     1,730,897

TRANSMISSION

Filed July 22, 1927     4 Sheets-Sheet 1

INVENTOR.
CHARLES G. PARKE.
BY
Harry G. Schroeder
ATTORNEY.

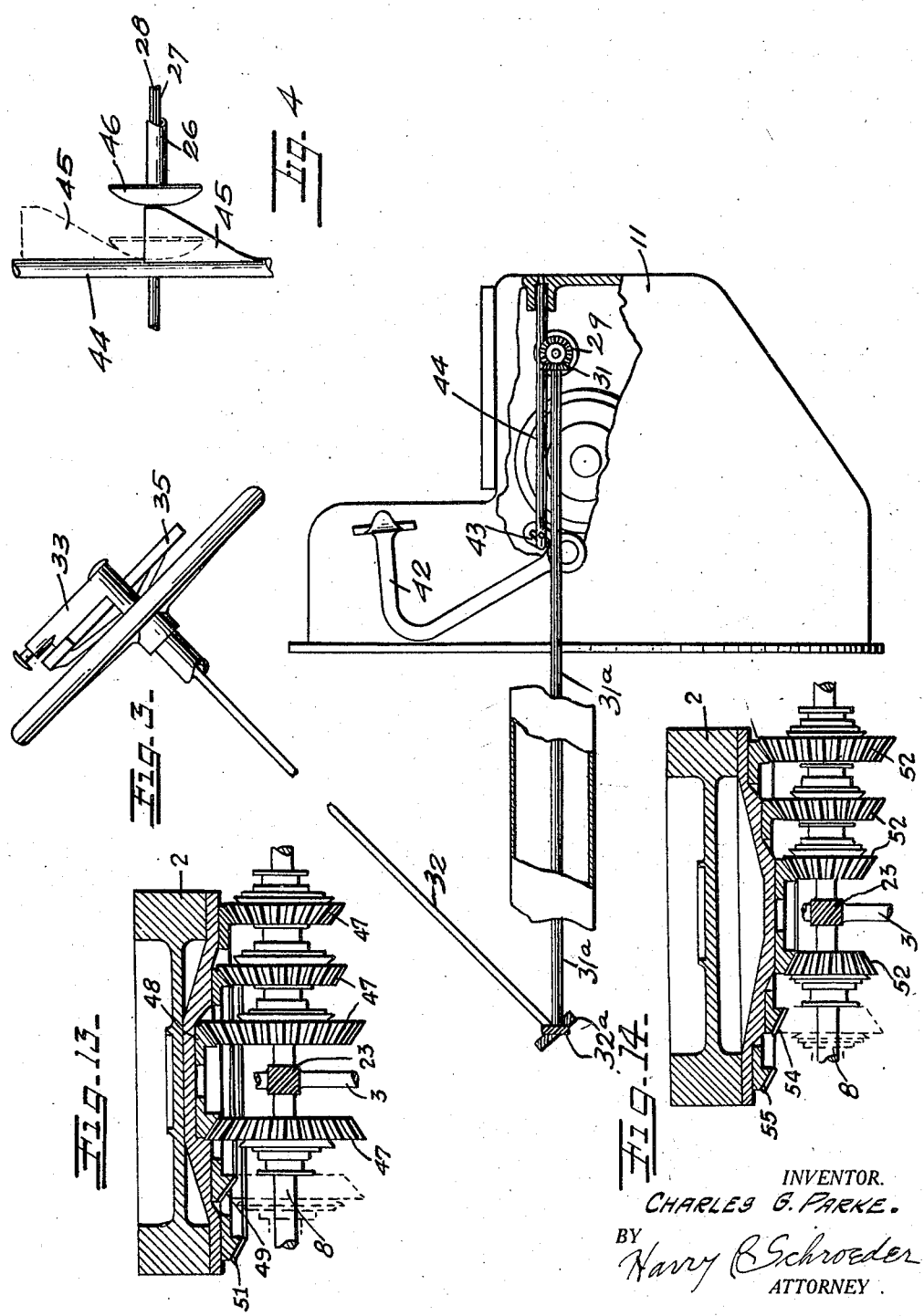

Oct. 8, 1929.  C. G. PARKE  1,730,897
TRANSMISSION
Filed July 22, 1927   4 Sheets-Sheet 3
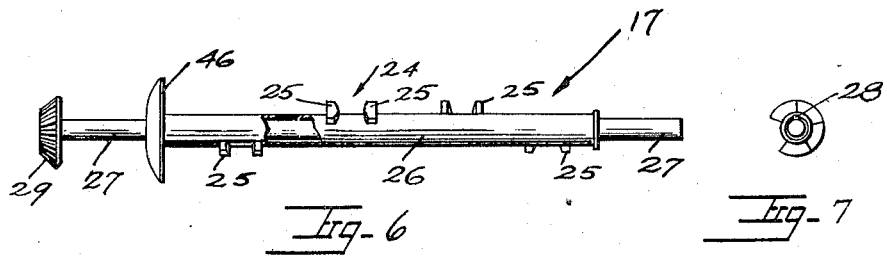
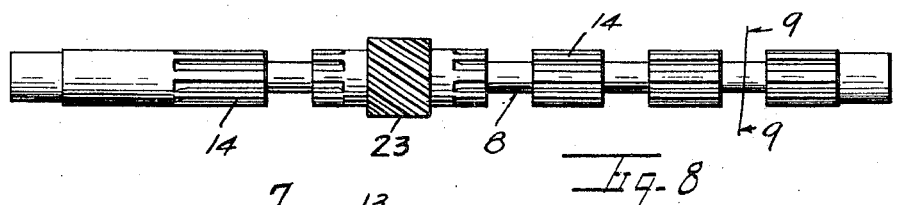
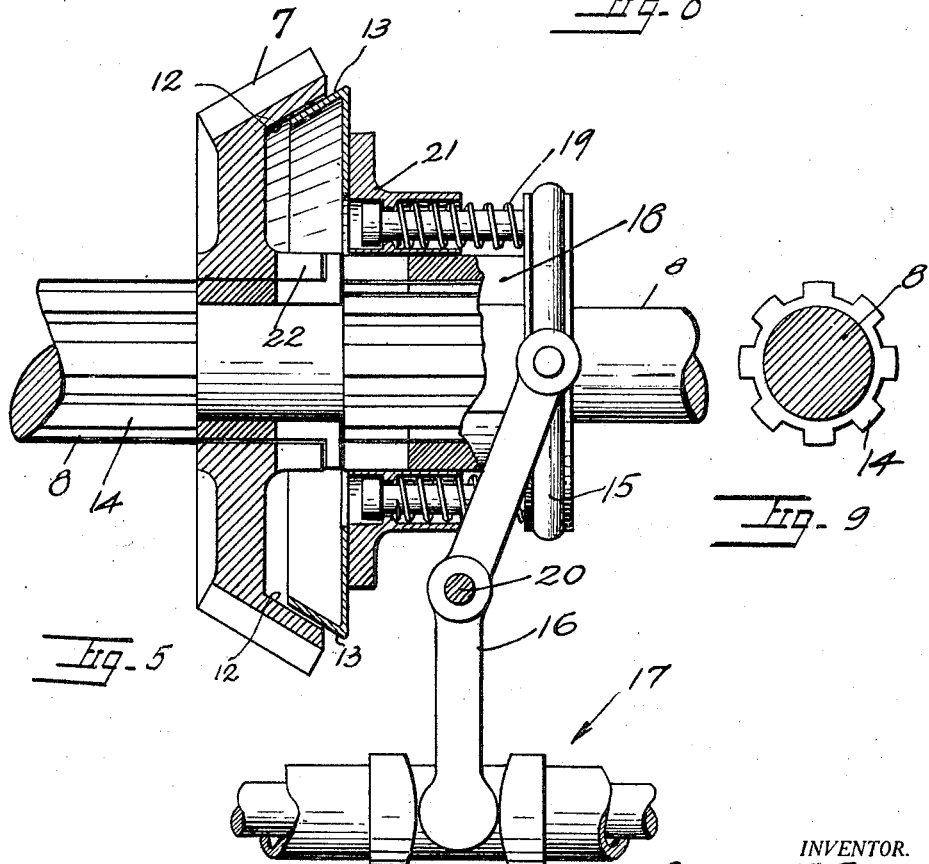
INVENTOR.
CHARLES G. PARKE
BY Harry G Schroeder
ATTORNEY.

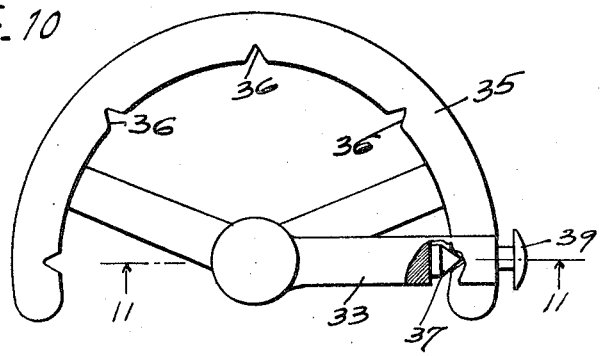
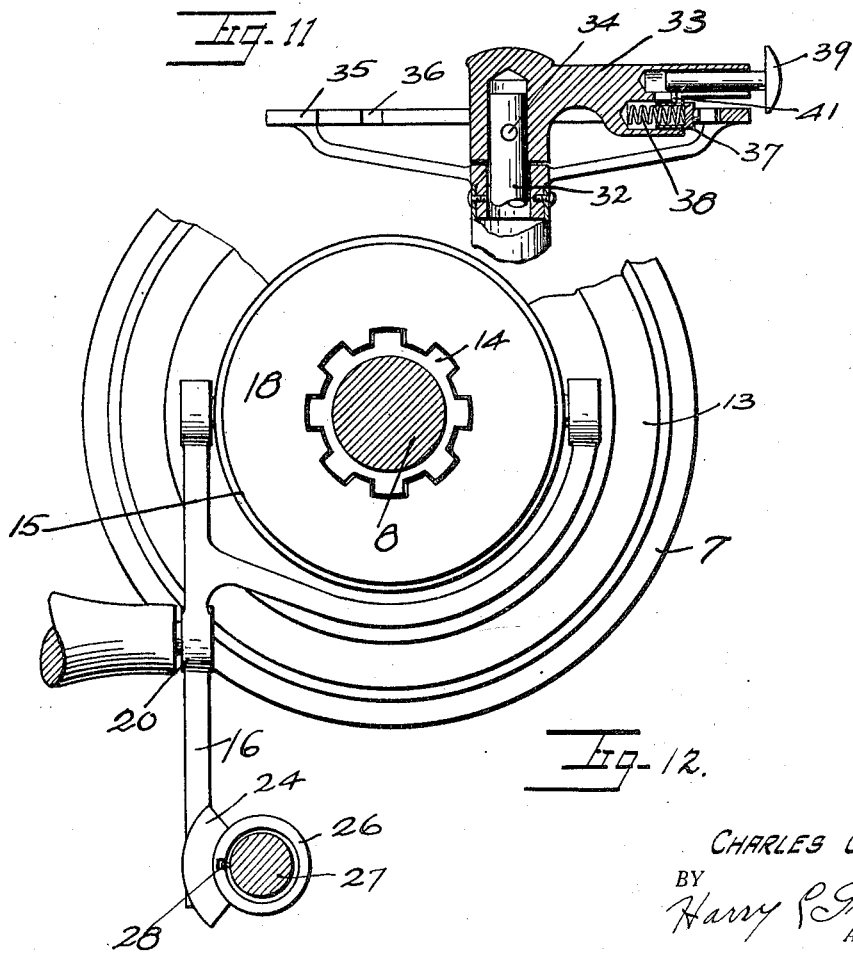

Patented Oct. 8, 1929

1,730,897

UNITED STATES PATENT OFFICE

CHARLES G. PARKE, OF OAKLAND, CALIFORNIA

TRANSMISSION

Application filed July 22, 1927. Serial No. 207,685.

The invention forming the subject matter of this application relates to transmission gearings used to transmit the power from the power plant to the driving mechanism of an object capable of locomotion.

The selective type of transmission gearing employed in the automotive industry involves the bringing of the driving and driven gears into mesh every time the gear ratio is changed. Frequently the gears do not mesh at the point of engagement and thereby cause inconvenience to the driver of the vehicle and also produce a crashing noise. The wear on the gears reduces the efficiency of the transmission in a comparatively short time. The complicated structure of the transmission prohibits the use of more than one gear ratio of reverse speed.

The propelling mechanism of marine vessels at present does not employ any transmission gearing at all except for the occasional employment of reduction gearing capable of transmitting power at a single speed in forward or reverse.

The propellers of aircrafts are secured directly to the shaft of the engine and the speed thereof cannot be regulated at all without changing the speed of the engine itself, thereby reducing the efficiency thereof.

The object of the present invention is to provide a transmission gearing in which the driving and driven gears are permanently in mesh and the selection of different gear ratios involves merely the selecting of a set of gears and connecting the same to the propeller shaft without anyway disturbing the relative position of the gears.

Another object of the invention is to provide a transmission gearing which is adaptable to any number of forward or reverse speed ratios.

A further object of the invention is to provide a transmission gearing which effects an equally efficient power transmission and speed ratio selection in either clockwise or contraclockwise rotation of the propeller shaft.

A still further object of the invention is to provide a transmission gearing to effect a noiseless positive transmission of power and to permit the selection of the required gear ratio by a readily adjustable mechanism so disposed as to be always visible to the driver or to the pilot.

Still another object of the invention is to provide a transmission gearing which determines the driving speed of the propelling means without necessitating any other gears or reduction mechanism outside of said transmission.

The above and other objects in view will more readily appear as the description proceeds.

The invention is concisely described in the following specification and in the attached claims and is clearly illustrated in the accompanying five sheets of drawing of which, Figure 1 is a sectional plan view of the transmission gearing and the gearing engaging mechanism.

Figure 2 is a rear elevation, the casing being partly broken away so as to disclose the glass, Figure 3 is a side elevation illustrating the relative position of the transmission gearing and the ratio selecting mechanism, Figure 4 is a fragmentary detail of the gear selecting mechanism, Figure 5 is a sectional detail of the driven gear and the clutch for the engagement thereof, Figure 6 is a detail view of the gear selecting cams and the cam adjusting sleeve, Figure 7 is a rear elevation of the cam sleeve, Figure 8 is a detail of the spline shaft showing the driving worm thereon, Figure 9 is a section taken along the line 9—9 of Figure 8.

Figure 10 is a plan view of the visible selecting mechanism,

Figure 11 is a cross section taken along the line of 11—11 of Figure 10.

Figure 12 is a side elevation of the clutch,

Figure 13 is a sectional view of a modified form of the transmission gears,

Figure 14 is a sectional view of another modified form of the transmission gears.

Figure 1:
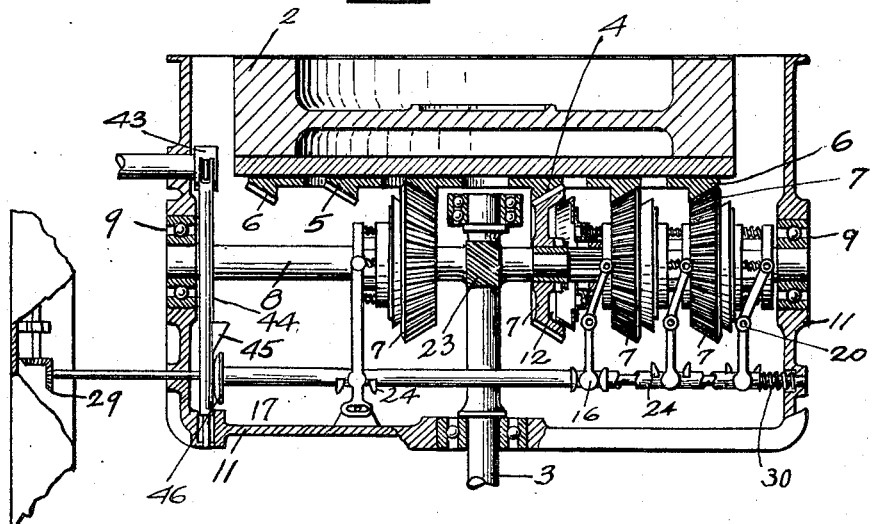
Figure 2:
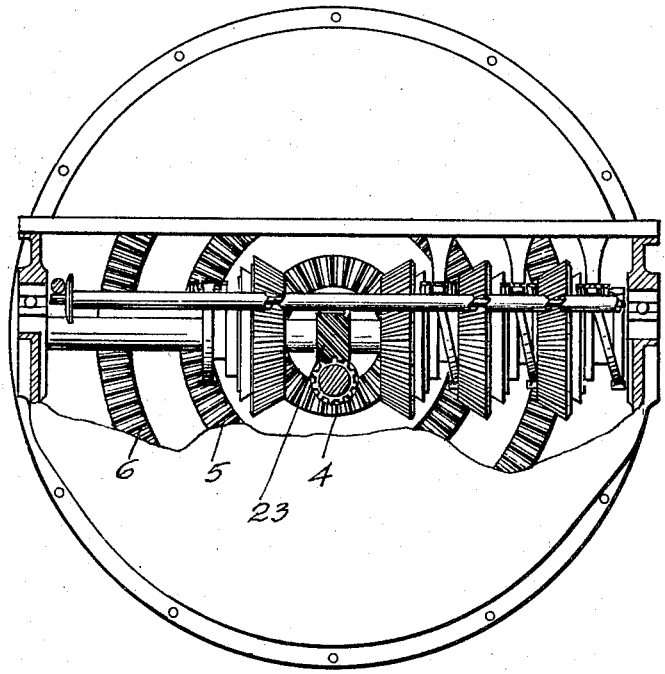

The power developed by an engine (not shown) is transmitted to a flywheel 2. The driving of a propeller shaft 3 is effected by means of concentric ringgears 4, 5 and 6, and bevel gears 7. The ringgears are secured to the flywheel 2 and rotate therewith, the gears 7 are disposed at right angles to the plane of the flywheel 2 and are permanently in mesh with the ringgears. A spline shaft 8 is rotatably supported in the thrust bearings 9 in the casing 11. The gears 7 are rotatable on the spline shaft, and are machined on the inside as at 12 so as to correspond to the outside periphery of a coneclutch 13.

Normally the coneclutch 13 is out of engagement with the gears 7. Splines 14 on the spline shaft 8 guide the coneclutch 13 into or out of engagement with the gear 7 and effect the transmitting of the engine power from the gear 7 to the spline shaft 8 when the clutch 13 is in engagement with said gear 7.

The clutch 13 is slid into engagement by a yoke 15. A lever 16 operates the yoke 15 said lever to be selected and actuated by the selecting mechanism 17 to be hereinafter described. The lever is pivoted in the casing 11 at 20.

When the flywheel 2 is rotated the ringgears 4, 5 and 6 rotate the gears 7 idly on the spline shaft 8. Ring gear 6 being nearest to the outside circumference of the flywheel 2 conveys the highest speed to the gear 7 in mesh therewith, while the ring gears 4 and 5 being closer to the center of rotation produce a speed less than that of the ring gear 6. When one of the levers 16 is moved around the pivot 20 thereof the cone clutch 13 being connected to said lever is brought thereby into frictional engagement with the inside face 12 of the gear 7 and is rotated thereby. The shaft 8 is rotated by the clutch 13. When the lever 16 advances the clutch 13, a driving dog 18 is advanced therewith, the movement thereof is resisted by springs 19 pressing against a driving dog flange 21. The action of said springs delays the movement of the driving dog 18, so that the movement thereof lags behind that of the cone clutch 13. The springs are so adjusted that one of the driving dogs 18 engages a jaw 22 in the gear 7 only when the spline shaft 8 is running at approximately the same speed as the gear 7, thereby insuring a smooth and noiseless engagement of the gear 7 by said shaft.

Now the spline shaft 8 is rotated by the gear 7 transmitting the power to the propeller shaft 3 by means of worm and gear connection 23. Said worm and gear connection functions as a reduction gearing, thereby eliminating the reduction gearing in the differential casing. The ratio selecting mechanism 17 comprises the cams 24 formed by parallelly protruding lugs 25 on a sleeve 26. The cams are radially protruding from the sleeve and are arranged at different angles relative to each other so that only one cam at a time is in registry with a lever 16. The sleeve 26 is slidable on a cam shaft 27 and is rotatable thereby by means of a key 28 therein. As shown in Figure 7, the cams 24 are so arranged that a section of the sleeve 26 along the full length thereof has no cams thereon, so that when said section of the sleeve is turned opposite the levers 16, the sliding movement of the sleeve will not engage any of the clutches, thus providing a neutral position. A spring 30 is disposed around the cam shaft 27 and bears against an end of the sleeve 26 for forcing the same in the direction of a cam shaft rotating means to be hereinafter set forth.

A bevel gear 29 secured to the camshaft 27 is in mesh with another bevel gear 31, said bevel gear 31 to be turned by a rod 31$^a$, said rod to be rotated by a second rod 32 by means of the gearing 32$^a$. A hand lever 33 is secured to the end of the rod 32 by means of a cross pin 34 and is rotatable relative to a sector or quadrant 35 fixedly secured to the steering jacket of the steering gear of a vehicle.

In order to make the selection of a speed ratio visible to the driver notches 36 are cut into the sector 35 at predetermined intervals, so as to correspond with the different positions of the camsleeve 26 when one or the other or none of the cams 24 is in operative relation to one of the levers 16.

A plunger 37 is slidably mounted in the handlever 33 and is pressed by a spring 38 against the inside periphery of the sector or quadrant 35. Every time when the lever reaches a point where a certain cam is in operative position or where all the cams are in an operative position the plunger 37 is pressed into one of said notches, thereby securing the lever and the cam in said relative position. A release latch 39 is provided to release the lever 33.

A projection 41 extends from the latch 39 into the plunger 37 so that the movement of the latch 39 into the handle 33 removes the plunger 37 from the notch 36 thereby permitting further adjusting of said handlever. The position of said handlever always determines and indicates which cam is engaged thereby indicating the gear ratio actuated by said cam, or indicating the aforesaid neutral position.

When the selected cam 24 is turned opposite the selected lever 16 by the aforesaid means, so that the lever 16 is between the parallel lugs 25, the lever 16 is actuated by the pressing down and releasing of a standard clutch pedal 42. While the hand lever 33 is turned or shifted the clutch pedal 42 is pressed downwardly and is held in the disengaged position by the foot of the driver. The pressing down of the pedal 42, turns a lever 43, thereby moving a second lever 44, said second lever having a wedge 45 thereon. The end of the cam sleeve 26 adjacent to the wedge 45 is formed in the shape of a mushroom cam 46. In the depressed or disengaged position of the clutch pedal 42 heretofore described the wedge 45 is spaced from the mushroom cam 46, and the spring 30 forces the sleeve 26 below the wedge 45; the selected cam 24 at the same time turns the lever 16 so as to withdraw the clutch 13 from the respective gear 7. The released levers 16 now depend in alignment with the positions of the respective cams 24. Springs 19 also aid in the disengagement of the clutch 13 and in the turning of the levers 16.

After the hand lever 33 is adjusted, and the selective cam 24 is disposed opposite to the free end of the selective lever 16, and embraces the free end thereof, the clutch pedal 42 is released, thereby returning the lever 43 and moving the lever 44 so that the wedge 45 gradually exerts a pressure upon the mushroom cam 46 thereby advancing the camsleeve 26 on the cam shaft 27 against the action of the spring 30. The longitudinal movement of the cam sleeve 26 advances the cams 24, one of said cams being engaged with one of said levers 16, thus said lever 16 is turned around the pivot point thereof and brings the respective cone clutch 13 and clutch dog 18 in engagement with the selective gear 7, thereby effecting the rotation of the propeller shaft 3 by the spline shaft 8 at the rate of speed determined by the ratio of the gears selected by the lever 33. The engaging movement of the clutch pedal 42, after released, is effected in the usual manner by the usual spring drawing the clutch pedal 42 upwardly, thereby moving the wedge 45 into engagement with the mushroom cam 46.

In the form shown in Figure 13 I illustrate an arrangement whereby I produce a higher range of speed ratios. In this form of gear transmission the gears 47 are gradually decreasing in size toward the periphery of the flywheel 2, accordingly the ringgears 48, 49, and 51 must be secured to the face of the flywheel on different levels so as to mesh with said gears 47.

The form illustrated in Figure 14 illustrates a condition opposite to the one shown in Figure 13. Here the diameter of the gears 52 gradually increases toward the periphery of the flywheel 2, thereby necessitating the arrangement of the gear rings 53, 54 and 55 on different levels and steps, the gear ring 55 being the farthest from the center line of the gears 52.

The transmission heretofore described is shifted simply by manipulating the hand lever 33. As the handlever is attached to the steering jacket near to the steering wheel, the driver is allowed to shift gears without taking his eyes off the road or the steering wheel. When the driver intends to shift gears first the clutch pedal 42 is pressed downwardly, similarly to the standard practice used at present, thereby disengaging the wedge 45 from the mushroom 46, then the hand lever 33 is adjusted to the desired notch 36 on the quadrant 35 indicating the desired forward or reversed speed. The handlever 33 is then secured in position by the spring latch 39. When the handlever is turned, the rotation is transferred to the camsleeve 36 by the bevel gears 29 and 31 and the camshaft 27 so that when the handlever 33 is secured in the selected notch, one of the cams 24 is just engaging the free end of the corresponding lever 16 to operate the clutch 13.

Now the clutch pedal 42 is released, being moved by the usual spring construction, thereby forcing the wedge 45 against the mushroom cam 46, and resulting in the longitudinal sliding of the camsleeve 26, on the camshaft 27. The cams 24 moved therewith turn the engaged lever 16, and engage the clutch 13 and the dog 18 to the gear transmission to produce the speed ratio represented by the selected notch. The said spline shaft 8 in turn drives the propeller shaft 3. The drive dog 18 transmits the power from the gearing to the spline shaft 8.

The transmission gearing can be readily made with just as many reverse speed ratios as forward. The reverse engaging levers are actuated similarly to the forward levers, except that the pivot point is removed to a point beyond the camsleeve or below the point where the force is applied thereto, thereby reversing the direction of the clutch travel. The reverse gears are connected to the ring gears in diametrically opposite positions to the forward gears and a reverse gear may be attached to the spline shaft opposite every ringgear thereby providing the required selectivity of reverse speed ratios.

The importance of the selective reverse transmission gearing appears most fully when used on marine vessels and also makes it permissible to use the same transmission gearing with the same engine regardless the direction of rotation of the driving propeller.

It is evident from the description that although the preferred embodiment of my device is illustrated in the best form for use in the automotive industry, it involves only slight modifications to adapt the same to the marine or aircraft practice and that these modifications may be readily performed by persons skilled in the art.

Therefore, be it understood that I do not desire to be limited to the preferred embodiment of the invention heretofore described but that only such limitations shall be imposed as are indicated in the appended claims.

Having thus described my invention what I now claim and desire to secure by Letters Patent is:

1. The combination with a transmission gearing having means thereon to be engaged at different gear ratios and means to operate said engaging means, of a quadrant fixedly secured to the machine, a handlever pivotally supported relative to the quadrant, a camshaft being rotated by said handlever, a sleeve slidable on said camshaft, cams on said sleeve, and means to move said sleeve relative to said shaft when a selected cam is in operative relation to said gear ratio engaging means.

2. The combination with a transmission gearing having means thereon to be engaged at different gear ratios and means to operate said engaging means, of a quadrant fixedly secured to the machine, a handlever pivotally supported relative to the quadrant, a camshaft being rotated by said handlever, a sleeve slidable on said camshaft, cams on said sleeve, and means to move said sleeve relative to said shaft when a selected cam is in operative relation to said gear ratio engaging means, said last means comprising a mushroom cam at the extremity of said sleeve, a wedge in operative relation to said mushroom cam, and means to actuate said wedge.

3. The combination with a transmission having a driving mechanism, a driven mechanism, and a plurality of devices for transmitting power from the driving to the driven mechanism, of a controlling member for each device for moving the said device to establish operative relation between the driving and driven mechanisms; a shaft supported in operative relation to said controlling members; an actuating element for each controlling member, said elements being connected to each other and being simultaneously slidable on said shaft, and being rotatable therewith; said elements being so disposed that each element is brought in operative position by a different degree of rotation of the shaft; a selecting mechanism for rotating said shaft so as to bring the selected actuating element into or out of coacting relation with said controlling member; and means for sliding said actuating elements on said shaft so as to cause the selected element to actuate the selected controlling member and for maintaining said elements in said actuating position.

4. The combination with a transmission having a driving mechanism, a driven mechanism, and a plurality of devices for transmitting power from the driving to the driven mechanism, of a controlling member for each device for moving the said device to establish operative relation between the driving and driven mechanisms; a shaft supported in oprative relation to said controlling members; an actuating element for each controlling member, said elements being connected to each other and being simultaneously slidable on said shaft, and being rotatable therewith; said elements being so disposed that each element is brought in operative position by a different degree of rotation of the shaft; a selecting mechanism for rotating said shaft so as to bring the selected actuating element into or out of coacting relation with said controlling member; means for sliding said actuating elements on said shaft so as to cause the selected element to actuate the selected controlling member and for maintaining said elements in said actuating position; and resilient means for sliding said actuating element for moving the respective controlling member in inoperative position, when said first element sliding means are inoperative; said selecting mechanism being rotated when the said first element sliding means are inoperative.

5. The combination with a transmission having a driving mechanism, a driven mechanism, and a plurality of devices for transmitting power from the driving to the driven mechanism, of a lever for each device for moving the said device to establish operative relation between the driving and driven mechanisms; a shaft supported in operative relation to said levers; a cam for each lever for actuating the same, said cams being connected to each other so as to be simultaneously slidable on said shaft and being rotatable with the shaft, said cams being so disposed that each cam is brought in actuating position by a different degree of rotation of the shaft; a selecting mechanism for rotating said shaft to the desired degree; and means for sliding said cams on said shaft so as to cause the movement of the selected lever, thereby moving and maintaining the corresponding device in operative position.

6. The combination with a transmission having a driving mechanism, a driven mechanism, and a plurality of devices for transmitting power from the driving to the driven mechanism, of a lever for each device for moving the said device to establish operative relation between the driving and driven mechanisms; a shaft supported in operative relation to said levers; a cam for each lever for actuating the same, said cams being connected to each other so as to be simultaneously slidable on said shaft and being rotatable with the shaft, said cams being so disposed that each cam is brought in actuating position by a different degree of rotation of the shaft; a selecting mechanism for rotating said shaft to the desired degree; means for sliding said cams on said shaft so as to cause the movement of the selected lever, thereby moving and maintaining the corresponding device in operative position; and resilient means for sliding the cams on the shaft so as to return the cams and the said lever into an inactive position when said first cam sliding means is inoperative.

7. The combination with a transmission having a driving mechanism, a driven mechanism, and a plurality of devices for transmitting power from the driving to the driven mechanism, of a lever for each device for moving the said device to establish operative relation between the driving and driven mechanisms; a shaft supported in operative relation to said levers; a cam for each lever for actuating the same, said cams being connected to each other so as to be simultaneously slidable on said shaft and being rotatable with the shaft, said cams being so disposed that each cam is brought in actuating position by a different degree of rotation of the shaft; a quadrant fixedly supported at a point outside of the transmission; a hand lever pivotally supported relative to the quadrant; means for transmitting rotation from said hand lever to the shaft so as to rotate the same to the desired degree corresponding to a certain position of said hand lever; and means for sliding said cams on said shaft so as to cause the movement of the selected lever, thereby moving and maintaining the corresponding device in operative position.

8. The combination with a transmission having a driving mechanism, a driven mechanism, and a plurality of devices for transmitting power from the driving to the driven mechanism, of a lever for each device for moving the said device to establish operative relation between the driving and driven mechanisms; a shaft rotatably supported in operative relation to said levers; a sleeve slidable on the shaft and being rotatable therewith; a cam on the sleeve for each lever for actuating the lever, said cams being so disposed that each cam is brought in a lever actuating position by the rotation of the shaft; a selecting mechanism for rotating said shaft to the desired position; means for sliding the sleeve so as to cause the actuation of the selected lever by the corresponding cam, thereby moving and maintaining the corresponding device in operative position and resilient means for sliding the sleeve into inactive position when the said first sliding means is inoperative.

9. The combination with a transmission having a driving mechanism, a driven mechanism, and a plurality of devices for transmitting power from the driving to the driven mechanism, of a lever for each device for moving the said device to establish operative relation between the driving and driven mechanisms; a shaft rotatably supported in operative relation to said levers; a sleeve slidable on the shaft and being rotatable therewith; a cam on the sleeve for each lever for actuating the lever, said cams being so disposed that each cam is brought in a lever actuating position by the rotation of the shaft; a selecting mechanism for rotating said shaft to the desired position; a resiliently mounted clutch pedal; connecting elements for transmitting movement from the clutch pedal to the sleeve; means on the connecting elements for normally sliding the sleeve into active position, said last means releasing said sleeve when the clutch pedal is depressed; and resilient means for sliding the sleeve into inactive position when the clutch pedal is depressed, said selecting means being manipulated when the clutch pedal is in a depressed position.

10. The combination with a transmission having a driving mechanism, a driven mechanism, and a plurality of devices for transmitting power from the driving to the driven mechanism, of a lever for each device for moving the said device to establish operative relation between the driving and driven mechanisms; a shaft rotatably supported in operative relation to said levers; a sleeve slidable on the shaft and being rotatable therewith; a cam on the sleeve for each lever for actuating the lever, said cams being so disposed that each cam is brought in a lever actuating position by the rotation of the shaft; a quadrant fixedly supported at a point outside of the transmission; a hand lever pivotally supported relative to the quadrant; means for transmitting rotation from said hand lever to the shaft so as to rotate the same to a desired degree corresponding to a certain position of the hand lever; a resiliently mounted clutch pedal; connecting elements for transmitting movement from the clutch pedal to the sleeve; means on the connecting elements for normally sliding the sleeve into active position, said last means releasing said sleeve when the clutch pedal is depressed; and resilient means for sliding the sleeve into inactive position when the clutch pedal is depressed, said hand lever being manipulated when the clutch pedal is depressed.

In testimony whereof I affix my signature.

CHARLES G. PARKE.